INVENTOR.
CECIL E. ADAMS

Nov. 3, 1959 C. E. ADAMS 2,910,839
HYDRAULIC TRANSMISSION AND CONTROL MECHANISM
FOR AIR CONDITIONING SYSTEM
Filed Dec. 17, 1954 4 Sheets-Sheet 3

INVENTOR.
CECIL E. ADAMS
BY
Herschel C. Omohundro
attorney

Nov. 3, 1959                C. E. ADAMS                2,910,839
       HYDRAULIC TRANSMISSION AND CONTROL MECHANISM
                  FOR AIR CONDITIONING SYSTEM
Filed Dec. 17, 1954                           4 Sheets-Sheet 4

INVENTOR.
CECIL E. ADAMS
BY
Herschel C. Omohundro
attorney

United States Patent Office 2,910,839
Patented Nov. 3, 1959

2,910,839

HYDRAULIC TRANSMISSION AND CONTROL MECHANISM FOR AIR CONDITIONING SYSTEM

Cecil E. Adams, Columbus, Ohio, assignor, by mesne assignments, to American Brake Shoe Company, New York, N.Y., a corporation of Delaware Application December 17, 1954, Serial No. 475,994

10 Claims. (Cl. 62—196)

This invention relates generally to air conditioning apparatus for motor driven vehicles and is more particularly directed to motion transmitting or driving means and control mechanism for such air conditioning apparatus. Still more particularly the invention relates to a hydraulic transmission for utilizing the engine of the vehicle to drive the air conditioning apparatus and to improvements in fluid energy translating devices employed in the hydraulic transmission.

An object of this invention is to provide a hydraulic transmission for transmitting power from a vehicle engine to the compressor of an air conditioning apparatus, the transmission having a variable delivery pump operated by the vehicle engine and a fluid motor driven by fluid discharged from the pump, the motor being coupled to and operating the compressor of the air conditioning apparatus and to also provide a control mechanism by which the volume delivered by the pump may be varied to in turn change the rate of operation of the motor and consequently the rate of operation of the compressor.

An object also is to provide, in an air conditioning system for the passenger compartment of an engine driven vehicle, a hydraulic transmission of the type set forth in the preceding paragraph together with an electrically operated fan or blower for circulating air over the expansion coil or evaporator of the air conditioning apparatus, the control mechanism having means for simultaneously governing the transmission and the air circulating means to vary the effectiveness of the apparatus.

Another object of the invention is to provide a hydraulic transmission having a variable volume pump and an improved fluid motor, the latter having novel valve means incorporated therein which is responsive to the volume of fluid supplied thereto by the pump to operate the compressor of the air conditioning apparatus or permit it to remain idle, the valve means also being effective as a safety device to by-pass fluid around the motor to exhaust in the event the motor is loaded unduly, the transmission thus being protected against injury in the event certain troubles develop.

A further object of the invention is to provide a fluid motor having an inlet, a rotor chamber and an outlet and a by-pass passage directly connecting the inlet and outlet, this passage having a valve element which is normally biased to an open position to permit fluid to by-pass the rotor chamber, there being means responsive to fluid flow at a predetermined volume to the motor to close the valve and direct all the fluid through the rotor chamber, the valve biasing means being operative to again move the valve to the by-pass passage opening position in the event excessive opposition is offered to the operation of the fluid motor.

A still further object of the invention is to provide a fluid motor having inlet, rotor and outlet chambers and a movable partition dividing the inlet chamber into sections, one thereof being connected directly with the outlet chamber by a by-pass passage, the partition carrying a valve element for opening and closing the by-pass passage in response to movement of the partition, the latter being moved in response to pressure differentials caused by fluid flow through an orifice establishing restricted communication between the sections of the inlet chamber formed by the partition, means being provided to cause differentials in areas on opposite sides of the partition so that, in the event fluid pressures at opposite sides thereof are equal, forces on opposite sides will be unequal and the partition will be urged in a direction to cause the valve element to open the by-pass passage and direct fluid to exhaust without operating the motor.

Further objects and advantages of the present invention will be apparent from the following description, reference being had to the accompanying drawings wherein a preferred form of embodiment of the invention is clearly shown.

Figure 1:
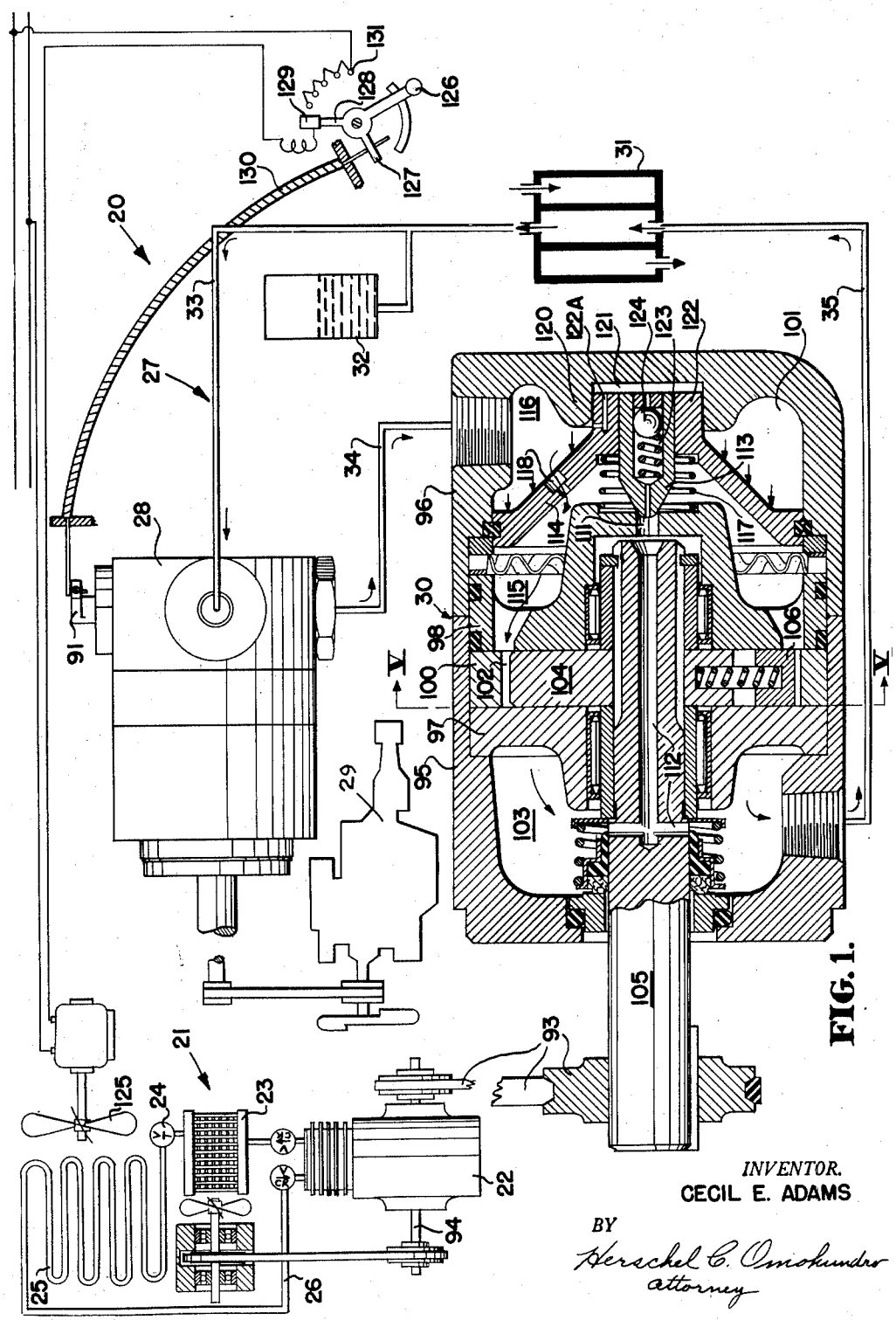
Fig. 1 is a diagrammatic view of the combined hydraulic system and electrical circuit used in carrying out the principles of the present invention, parts of the apparatus being shown diagrammatically and other parts being shown in longitudinal section.

Referring more particularly to the drawings and especially Fig. 1, the numeral 20 designates the apparatus in its entirety. This apparatus includes a refrigerating system 21 which is shown diagrammatically and includes a compressor 22, a condenser 23, an expansion valve 24, an expansion coil or evaporator 25, and a fluid line 26 leading from the latter to the inlet of the compressor 22.

The apparatus also includes a hydraulic transmission system, designated generally by the numeral 27, this system including a variable volume pump 28, a fluid motor 30, a cooler 31 and an accumulator or reservoir 32, a fluid line 33 leading from the reservoir to the inlet of the pump, a second fluid line 34 leading from the outlet of the pump to the inlet of the fluid motor, and a third line 35 extending from the outlet of the fluid motor to the cooler and back to the reservoir 32.

Figure 2:
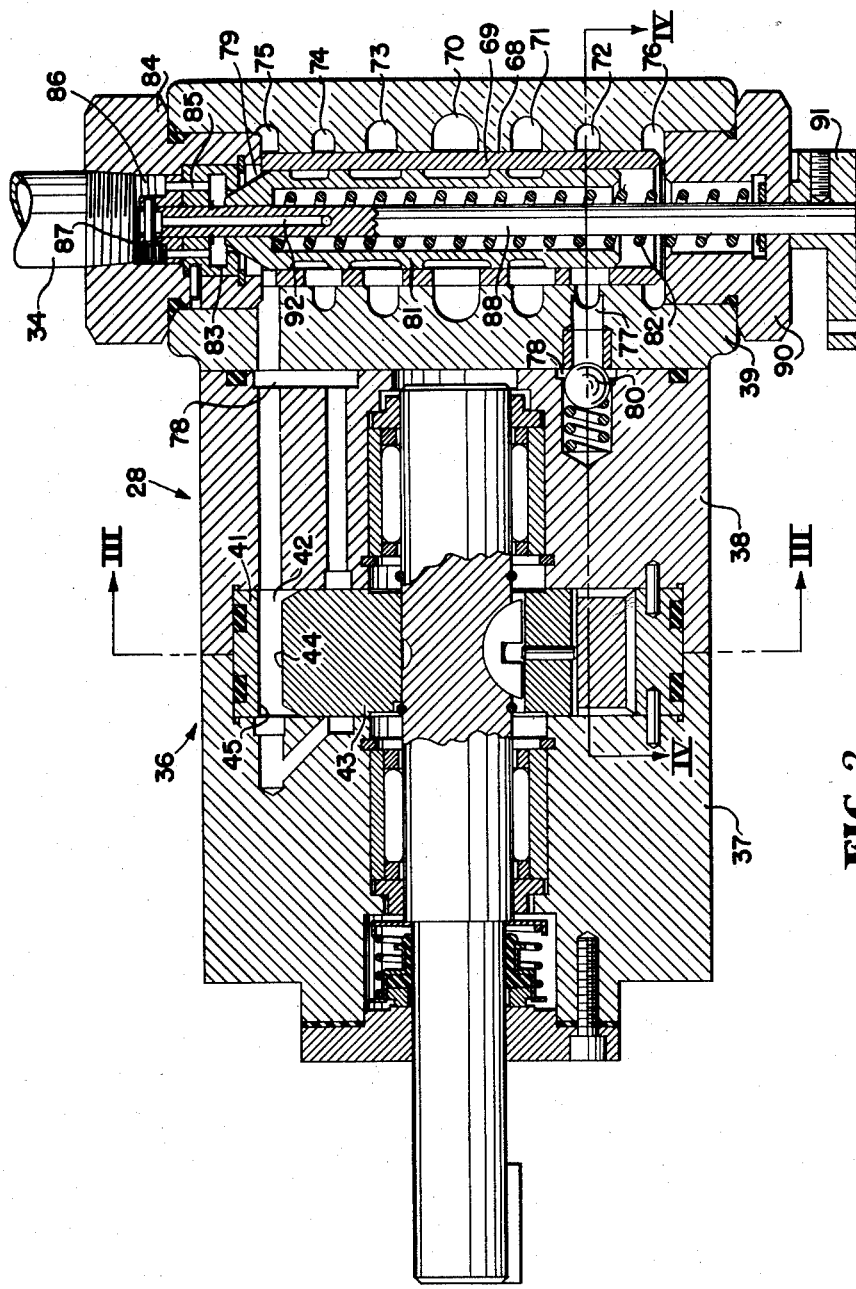
Fig. 2 is a longitudinal sectional view taken through a variable volume pump employed in the hydraulic transmission forming part of the present invention.
Figure 3:
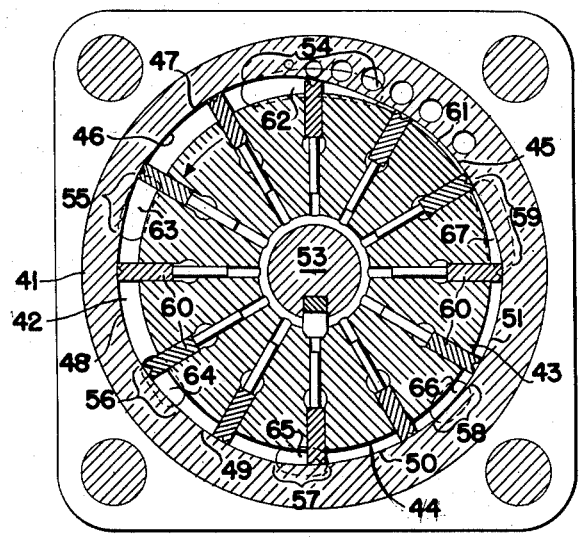
Fig. 3 is a vertical transverse sectional view taken through the pump on the plane indicated by the lines III—III of Fig. 2.
Figure 4:
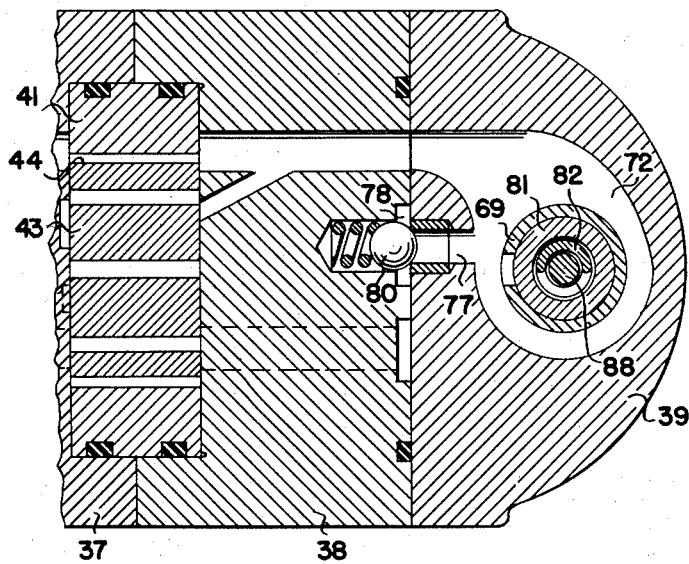
Fig. 4 is a horizontal sectional view taken through the pump on the plane indicated by the line IV—IV of Fig. 2.

The pump 28 is of the type shown in the co-pending application of Cecil E. Adams et al., Serial No. 416,768, filed March 17, 1954, now Patent No. 2,878,753, dated March 24, 1959, to which reference may be had for a detailed description. This pump is shown in Figs. 2 to 4, inclusive, and sufficient description to facilitate an understanding of the present invention will be given herein. This pump is of the variable volume vane type and is adapted to be driven by the engine 29 of the vehicle to which the air conditioning system is to be applied. The pump 28 includes a casing 36 which, in this instance, is formed of three sections 37, 38 and 39. Sections 37 and 38 are recessed to receive and cooperate with a cam ring 41 to form a rotor chamber 42 for the reception of a rotor 43, the rotor being circular and of such size that the circumferential wall 44 thereof will be slightly spaced from one portion 45 of the cam surface or peripheral wall 46 of the chamber formed by the cam ring 41 and sections 37 and 38.

From Fig. 3, it will be noted that the cam ring has a specially shaped cam surface 46 including a plurality of sections 45 and 47 to 51, inclusive, these portions being concentric with the axial center of the rotor and shaft 53 supporting the latter for rotation. The concentric sections of the cam surface are connected by ramp portions 54 to 59, inclusive, these ramps providing for the smooth movement of radially extending vanes 60 carried by the rotor, from one concentric section to the other. It will be noted from Fig. 3 that the concentric sections 45 and 47 to 51, inclusive, are spaced different distances from the axis of rotation of the rotor. This differential in spacing causes variations in the volumetric capacity of fluid transfer pockets 61 formed between the radially extending vanes 60 and the walls of the rotor and its chamber. The vanes have sliding contact with the cam surface and, as the rotor revolves in the direction indicated by the arrow in Fig. 3, the fluid transfer pockets change in size. When the vanes move over the ramp portion 54, the fluid transfer pockets increase in size and, as the vanes move over the other ramps, the fluid transfer pockets decrease in size. The casing sections are formed with ports 62 to 67, inclusive, which communicate with the rotor chamber in registration with the various ramps. The port 62 registering with ramp 54 constitutes an inlet port while the other ports 63 to 67 registering with ramps 55 to 59, inclusive, respectively constitute outlet ports. When the fluid transfer pockets communicate with the inlet port, fluid will be drawn into the fluid transfer pockets through the inlet port. As the transfer pockets continue to move around the rotor chamber, portions of the fluid drawn in will be expelled from the various outlet ports, the percentages of the volume being predetermined by the design of the cam ring. Fluid is conducted to the inlet port 62 through passages formed in the casing sections 37, 38 and 39, the latter constituting a valve casing.

In Fig. 2, the casing section 39 is shown in longitudinal section. It will be observed from this figure that section 39 includes a longitudinal bore 68 and chambers 70 to 76, inclusive, spaced longitudinally thereof. The bore receives a sleeve 69 in which ports are provided to establish communication between the chambers 70 to 76 and the interior of the sleeve. Chamber 70 is connected with the inlet port 62 and with the conduit 33 leading from the reservoir. Chambers 71, 72, 73, 74 and 75 are connected, by passages formed in the casing sections 38 and 39, with the outlet ports 63 to 67, inclusive, each chamber being connected with a different outlet port. As shown in Figs. 2 and 4, chamber 72 is also connected with passage 77 formed in casing sections 38 and 39 through which fluid conducted to the chamber from the pump outlet port connected therewith may flow from the chamber to a manifold 78 formed between casing sections 38 and 39. The chambers 71, 73 and 74 are connected with the manifold in the same manner as chamber 72 is connected, this manifold communicating directly with the pump outlet port which connects with chamber 75. As the pump rotor revolves and fluid is expelled through the outlet ports, this fluid will flow to the respective chambers 71, 72, 73, 74 and 75, the fluid flowing to the first four chambers being conducted through the passages 77 connected therewith to the manifold 78 and from this manifold to chamber 75 which communicates with the outlet 79 of casing section 39 which outlet communicates with conduit 34. The passages leading from chambers 71, 72, 73 and 74 are provided with spring pressed ball check valves 80 which prevent fluid flowing from the manifold back into the chambers. All fluid going to this manifold must flow through chamber 75 to outlet conduit 34.

The sleeve 69 is provided to receive a spool valve element 81 which is urged in one direction in the sleeve by a coil spring 82. Movement of the valve element in this direction is limited by an insert 83 disposed in a fitting 84 secured in the open end of the bore 68. Fluid discharged into chamber 75 will apply a force to the end of the spool valve engaging the insert 83 and urge this spool valve in a direction opposed to that caused by the spring 82. The spool valve forms a part of a device which functions in the nature of a hydrostatic flow control element which is responsive to a pressure differential, caused by passing some of the fluid discharged from the pump through an orifice 85, to recirculate some of the pump output back through the pump.

In this instance the orifice 85 is of variable size and is formed in the insert 83 immediately in advance of the pump discharge port 86 which is formed in fitting 84. The size of the orifice 85 is varied through the rotation of a gate member 87 disposed at the outlet side of the orifice 85. The gate member 87 is carried by a stem 88 extending through the valve spool and through a cap 90 provided at the opposite end of the casing section 39. This stem is equipped with a lever or other suitable device 91 to rotate the gate 87 and vary the size of the orifice 85. The end of the stem 88 which carries the gate 87 has a central opening 92 extending a portion of the distance longitudinally of the stem to establish communication between the inside of the spool and chamber 76 and the outlet side of the orifice. This construction permits the pressure existing at the outlet side of the orifice to be applied to one end of the valve spool, the opposite end of this spool being exposed to the pressure at the inlet side of the orifice. The spool has longitudinally spaced grooves therein to establish communication between various sets of the chambers 70, 71, 72, 73 and 74 depending upon the position of the spool.

The operation of the pump has been fully explained in the co-pending application. For the purposes of this application, it is sufficient to state that, as the rotor revolves and fluid is drawn from the conduit 33 into the pump chamber and expelled through the various outlet ports to the chambers in casing section 39 connected therewith, this fluid will flow through the passage to the manifold and from the manifold through chamber 75 and orifice 85 to the conduit 34. The shaft of the pump is connected with the vehicle engine in any suitable manner so that the pump will be driven by the engine. When the speed of the engine increases, the speed of rotation of the pump will also increase and consequently the volume of fluid delivered by the pump will increase also. As this volume increases, the pressure differential caused by the fluid flowing through the variable orifice 85 will be applied to opposite ends of the valve spool and will tend to cause this spool to move in opposition to the spring 82. The distance moved will depend upon the pressure differential and the force of the spring 82. As the spool moves, one or more of the chambers connected with the pump outlet ports will be connected with the chamber 70 so that more or less fluid will be re-circulated through the pump and the volume of fluid flowing through the pump discharge port to line 34 will be maintained as determined by the setting of the lever or knob 91. When the speed of the vehicle engine varies, the position of the valve spool will also vary to by-pass or re-circulate a variable quantity of fluid and maintain the desired output volume. If it is desired to change this volume, the setting of the gate 87 is changed through the adjustment of the knob 91.

As shown in Fig. 1, the line 34 leads from the pump 28 to the inlet of the fluid motor 30. The shaft of this motor is connected by pulleys and a belt or other suitable motion transmitting means 93 with the shaft 94 of the compressor 22, therefore, when the motor 30 is driven, the compressor will be operated. The construction of the motor 30 forms a part of the present invention.

Figure 5:
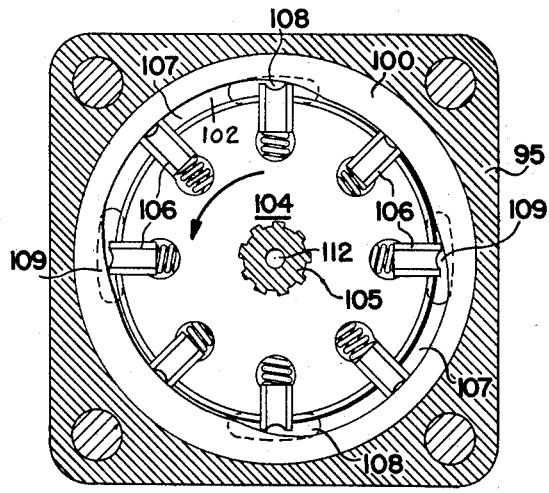
Fig. 5 is a vertical sectional view taken through a fluid motor employed in the hydraulic transmission forming a part of the present invention, the plane of the section being indicated by the line V—V of Fig. 1.

This motor includes a pair of casing sections 95 and 96, a pair of cheek plates 97 and 98 and a cam ring 100 disposed and clamped between the cheek plates. The casing sections, cheek plates and cam ring cooperate, as seen in Fig. 1, to provide the casing with inlet, rotor and outlet chambers 101, 102 and 103, respectively. The rotor chamber receives a rotor 104 which is mounted on a shaft 105 supported for rotation in bearings carried by cheek plates 97 and 98. The rotor has radially extending slots formed therein to receive vane elements 106 which are spring urged outwardly for engagement with the internal surface of the cam ring 100. This surface is generally of elliptical form, the ends of the ellipse being spaced a greater distance from the outer surface of the rotor 104 than the sides to form working chambers 107, as shown in Fig. 5. Inlet and outlet ports 108 and 109 are formed at the opposite ends of the working chambers, the inlet ports communicating with the inlet chamber 101 and the outlet ports communicating with the outlet chamber 103. Fluid supplied to the motor through line 34 will flow through the inlet chamber 101, through the inlet ports 108 (Fig. 5) to the rotor chamber 102 and will apply force to one side of the vanes 106 in the working chambers and tend to urge these vanes toward the outlet ports 109, the fluid flowing through the outlet ports to the outlet chamber 103 from which it will flow through line 35 to the cooler 31. As the vanes move, rotary motion will be imparted to the rotor 104 and shaft 105, this motion in turn being transmitted by the belt or other motion transmitting means 93 to the shaft of the compressor 22.

As shown in Fig. 1, cheek plate 98 and the shaft 105 of the motor 30 are provided with openings and passages 111 and 112 which directly establish communication between the inlet chamber 101 and the outlet chamber 103. The opening 111 in cheek plate 98 forms a seat for a valve element 113 which, in the present instance, is carried by a partition 114, this partition being arranged in the inlet chamber 101 for limited longitudinal movement. The partition divides the chamber 101 into a pair of sections 115 and 116, the latter of which communicates directly with the passage 34 while the other communicates with the rotor chamber. The opening 111 in cheek plate 98 and the passages 112 in shaft 105 communicate with the section 115 of the inlet chamber. Partition 114 and the valve element 113 carried thereby are urged in a direction away from the cheek plate 98 by a coil spring 117 so that, normally, when fluid is not flowing through the motor 30 or only a relatively small amount of fluid is flowing therethrough, the inlet chamber 101 will be directly connected with the outlet chamber by the opening 111 and passages 112 in cheek plate 98 and shaft 105. Fluid may then flow from the inlet chamber to the outlet chamber without flowing through the rotor chamber and the motor will then be idle.

Sections 115 and 116 of the inlet chamber communicate with one another through an orifice 118 formed in the partition. This orifice will create a pressure differential on fluid flowing through the orifice and, when a predetermined volume of fluid is supplied to the motor, the higher pressure of the differential will be great enough to cause the partition to move toward cheek plate 98 and seat the valve element 113 against the perimeter of the port 111 formed in the cheek plate 98. The by-pass passage formed by the port 111 and passages 112 will then be closed and fluid will be directed through the rotor chamber. Rotary movement will then be imparted to the shaft 105. As long as a sufficient amount of fluid flows through the motor to create the necessary pressure differential, the valve element will remain seated. When the volume of fluid supplied to the motor is reduced to a predetermined quantity, however, the pressure differential will not be maintained sufficient to overcome the force of the spring 117 and the valve element will be moved away from a by-pass passage closing position, the fluid supplied to the motor then being directed to the outlet port without passing through the rotor chamber. The motor will again be idle.

The partition 114 and valve 113 carried thereby have also been designed to serve as a relief valve or safety element. This object is accomplished by forming the casing section 96 with a boss-like projection 120 having a recess 121 formed therein to receive a hub 122 formed on the partition 114. This hub is received for sliding movement in the recess, the construction serving to create a differential in areas exposed to fluid pressure in the sections of the inlet chamber 101.

Figure 6:
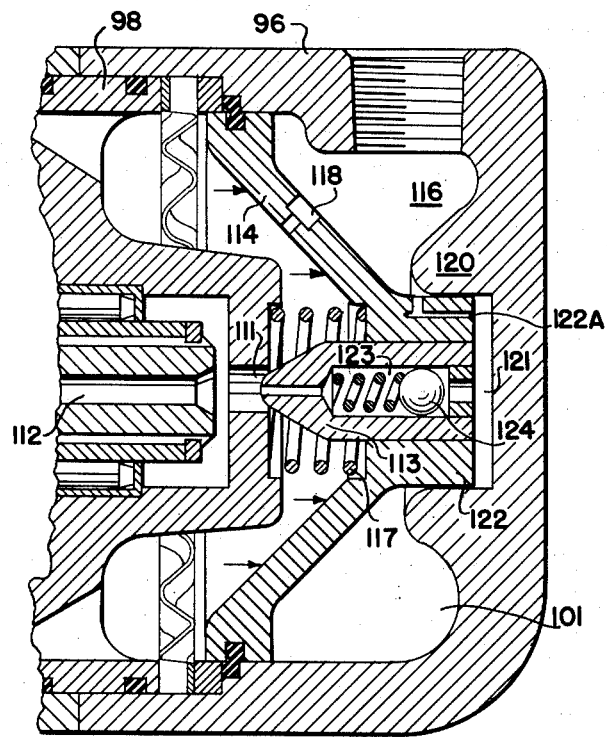
Fig. 6 is a fragmentary longitudinal sectional view taken through the motor and showing parts thereof in positions different from that shown in Fig. 1.

As shown in Fig. 1, hub 122 is drilled as at 122A to provide restricted communication between the inlet chamber section 116 and the recess 121. This communication will permit fluid to escape from the recess to the chamber section 116 when the partition is moved under the influence of spring 117 to space valve 113 from its seat. The valve element 113 is formed with a central passage 123 to establish communication between the recess 121 and the port 111, a spring pressed check valve 124 being provided in the valve element 113 to normally close this passage and interrupt flow therethrough. When the pressure in the recess increases sufficiently, however, the check valve 124 will open to permit fluid to flow from the recess to the by-pass passage and forces on opposite sides of the partition will be unbalanced. These unbalanced forces will cause the partition to move and withdraw the valve element 113 from the seat in cheek plate 98 to open the by-pass passage. This operation will occur in the event an excessive load is applied to the shaft 105 of the fluid motor 30. When this excessive load is applied, the pressure in the sections 115 and 116 of the inlet chamber 101 will be equalized through the orifice 118 but, since there is a differential of areas on opposite sides of the partition 114 exposed to this pressure and the greater area is exposed to section 115 which communicates with the rotor chamber, the partition will be moved causing fluid to be expelled from the recess 121 and the valve element 113 to be moved to a by-pass passage opening position. Fluid then flowing to the pump will pass from the inlet chamber directly to the outlet chamber while the motor is permitted to stand idle. The partition and valve elements are shown in the position just described in Fig. 6. Arrows are employed to show the application of the greater force to the partition to move the valve away from the valve seat.

One of the features of the invention is to provide a novel control mechanism whereby the rate of operation of the compressor 22 may be controlled simultaneously with the rate of operation of an electrically operated fan 125 employed to circulate air over the evaporator. This control mechanism is shown diagrammatically in Fig. 1. The control mechanism includes an actuating lever 126 which is mounted for pivotal movement in a location convenient for actuation by the operator of the vehicle. The lever has a pair of arms 127 and 128, the former of which is connected by a motion transmitting device 130, in this instance a push-pull wire, with the lever or knob 91 used to vary the size of the orifice 85 in pump 28. When the control lever is moved in one direction, the wire will transmit such motion to the knob 91 changing the setting of the variable orifice 85. When the orifice is changed in this manner, the volume of fluid delivered by the pump will be changed and consequently the rate of operation of the motor 30 will be correspondingly changed. Since this motor is connected with the compressor, the rate of operation of the latter will also be changed. It should be obvious that, if the control lever is moved to decrease the output of pump 28 sufficiently, the operation of motor 30 and the compressor may be interrupted. If the control lever is moved in the opposite direction, the volume of fluid discharged by the pump will be increased and the rate of operation of the motor 30 and the compressor will be increased. When the compressor operating rate is increased, the evaporator will cause an increased cooling effect and consequently it is desirable to increase the volume of air flowing over the evaporator. The control lever has, therefore, been provided with the second arm 128 which has a contact element 129 for cooperation with a variable resistance 131 connected in the circuit for the electric motor coupled with the fan 125. This arrangement permits the fan to be operated at various rates depending upon the position of the control lever. If the control is moved to increase the volume of fluid supplied to the fluid motor, the supply of current to the electric motor for the fan will also be increased to cause the fan to operate at a faster rate.

It will be obvious from the foregoing description and an inspection of the illustration in Fig. 1 that a single control has been provided to regulate the operation of the cooling element and the air circulating element. This control may also function to turn the devices "on" and "off." The diagrammatic view in Fig. 1 also shows a fan for circulating air over the condenser 23. This fan may be driven in any suitable manner such as by a belt and pulleys driven by the fluid motor 30 through the compressor shaft and driving mechanism therefor. The condenser fan will thus be operated at rates proportional to the rates of operation of the compressor.

While the form of embodiment of the present invention as herein disclosed constitutes a preferred form, it is to be understood that other forms might be adopted, all coming within the scope of the claims which follow.

I claim:

1. In cooling aparatus for the load carrying compartment of an engine driven vehicle, such apparatus being of the type having a compressor and evaporator, a variable volume fluid pump connected for operation by the vehicle engine; a fluid motor in driving relationship with said compressor and receiving fluid from said pump; means for varying the volume of said pump to govern the rate of operation of said motor and compressor; and valve means responsive to the volume of fluid being delivered to said motor and operative to by-pass said fluid to exhaust when the volume of fluid is reduced to a predetermined quantity.

2. In cooling apparatus for the load carrying compartment of an engine driven vehicle, such apparatus being of the type having a compressor and evaporator, a variable volume fluid pump connected for operation by the vehicle engine; a fluid motor in driving relationship with said compressor and receiving fluid from said pump; means for varying the volume of said pump to govern the rate of operation of said motor and compressor; valve means movable between a first position wherein substantially the total output volume of said pump is directed through said motor to effect operation thereof and a second position wherein said pump output volume is caused to be by-passed to exhaust; resilient means normally urging said valve toward the second position; and means forming a restricted passage through which fluid flows when effecting the operation of said motor, said restricted passage creating a pressure drop which is applied to said valve means to urge the same toward said first position in opposition to said resilient means.

3. In cooling apparatus of the type having a compressor and an evaporator, a variable speed prime mover means, a fluid pump driven by said variable speed prime mover means and varying in speed as the speed of said prime mover means varies, means for maintaining the output volume of said pump substantially constant when the speed of said pump varies, a fluid motor driven by said pump and driving said compressor, means for changing the output volume of said pump for changing the driven speed of said fluid motor and compressor, means for circulating fluid over said evaporator including a motor, means for changing the flow of a motivating medium to said last named motor, and means operating said pump output volume changing means and said means for changing the flow of motive means to said last named motor simultaneously to cause said last named motor to operate at a different speed for each adjusted position of said pump output volume changing means.

4. In cooling apparatus of the type having a compressor and an evaporator, a variable speed prime mover means, a fluid pump driven by said variable speed prime mover means and varying in speed as the speed of said prime mover means varies, means for maintaining the output volume of said pump substantially constant when the speed of said pump varies, a fluid motor driven by said pump and driving said compressor, means for changing the output volume of said pump for changing the driven speed of said fluid motor and compressor, means for circulating fluid over said evaporator including an electric motor, means for changing the flow of electric current to said last named motor, and means operating said pump output volume changing means and said means for changing the flow of electric current to said last named motor simultaneously to cause said last named motor to operate at a different speed for each adjusted position of said pump output volume changing means.

5. In cooling apparatus for the load carrying compartment of a vehicle including a variable speed engine, such apparatus being of the type having a compressor and an evaporator, a fluid pump driven by said variable speed engine and varying in speed as the speed of said engine varies, means for maintaining the output volume of said pump substantially constant when the speed of said pump varies, a fluid motor driven by said pump and driving said compressor, means for changing the output volume of said pump for changing the driven speed of said fluid motor and compressor, means for circulating fluid over said evaporator including a motor, means for changing the flow of a motivating medium to said last named motor, and means operating said pump output volume changing means and said means for changing the flow of motive means to said last named motor simultaneously to cause said last named motor to operate at a different speed for each adjusted position of said pump output volume changing means.

6. In cooling apparatus for the load carrying compartment of a vehicle including a variable speed engine, such apparatus being of the type having a compressor and an evaporator, a fluid pump driven by said variable speed engine and varying in speed as the speed of said engine varies, means for maintaining the output volume of said pump substantially constant when the speed of said pump varies, a fluid motor driven by said pump and driving said compressor, means for changing the output volume of said pump for changing the driven speed of said fluid motor and compressor, means for circulating fluid over said evaporator including an electric motor, means for changing the flow of electric current to said last named motor, and means operating said pump output volume changing means and said means for changing the flow of electric current to said last named motor simultaneously to cause said last named motor to operate at a different speed for each adjusted position of said pump output volume changing means.

7. In cooling apparatus of the type having a compressor and an evaporator a variable speed prime mover means, a fluid pump driven by said variable speed prime mover means and varying in speed as the speed of said prime mover means varies, a fluid motor driven by said pump and driving said compressor, means for maintaining the speed of said motor and compressor constant when the speed of said prime mover varies, means for adjusting the speed of said motor and compressor, means for circulating fluid over said evaporator including a motor, means for changing the flow of a motivating medium to said last named motor, and means operating said motor and compressor speed adjusting means and said means for changing said flow of motivating medium to said last named motor to cause said last named motor to operate at a different speed for each adjusted position of said motor and compressor speed adjusting means.

8. In cooling apparatus of the type having a compressor and an evaporator a variable speed prime mover means, a fluid pump driven by said variable speed prime mover means and varying in speed as the speed of said prime mover means varies, a fluid motor driven by said pump and driving said compressor, means for maintaining the speed of said motor and compressor constant when the speed of said prime mover varies, means for adjusting the speed of said motor and compressor, means for circulating fluid over said evaporator including an electric motor, means for changing the flow of electric current to said last named motor, and means operating said motor and compressor speed adjusting means and said means for changing said flow of electric current to said last named motor to cause said last named motor to operate at a different speed for each adjusted position of said motor and compressor speed adjusting means.

9. In cooling apparatus for the load carrying compartment of a vehicle including a variable speed engine, such apparatus being of the type having a compressor and an evaporator, fluid pump driven by said variable speed engine and varying in speed as the speed of said engine varies, a fluid motor driven by said pump and driving said compressor, means for maintaining the speed of said motor and compressor constant when the speed of said variable speed engine varies, means for adjusting the speed of said motor and compressor, means for circulating fluid over said evaporator, including a motor, means for changing the flow of a motivating medium to said last named motor, and means operating said motor and compressor speed adjusting means and said means for changing said flow of motivating medium to said last named motor to cause said last named motor to operate at a different speed for each adjusted position of said motor and compressor speed adjusting means.

10. In cooling apparatus for the load carrying compartment of a vehicle including a variable speed engine, such apparatus being of the type having a compressor and an evaporator, fluid pump driven by said variable speed engine and varying in speed as the speed of said engine varies, a fluid motor driven by said pump and driving said compressor, means for maintaining the speed of said motor and compressor constant when the speed of said variable speed engine varies, means for adjusting the speed of said motor and compressor, means for circulating fluid over said evaporator including an electric motor, means for changing the flow of electric current to said last named motor, and means operating said motor and compressor speed adjusting means and said means for changing said flow of electric current to said last named motor to cause said last named motor to operate at a different speed for each adjusted position of said motor and compressor speed adjusting means.

References Cited in the file of this patent

UNITED STATES PATENTS

| | | |
|---|---|---|
| 2,037,155 | Stuart | Apr. 14, 1936 |
| 2,128,090 | Hintze | Aug. 23, 1938 |
| 2,161,439 | Thoma | June 6, 1939 |
| 2,178,807 | Ploeger | Nov. 7, 1939 |
| 2,357,334 | Kendrick et al. | Sept. 5, 1944 |
| 2,375,076 | Caserta | May 1, 1945 |
| 2,467,398 | Miller | Apr. 19, 1949 |
| 2,486,467 | Devine et al. | Nov. 1, 1949 |
| 2,492,720 | Tyler | Dec. 27, 1949 |
| 2,518,316 | Henny | Aug. 8, 1950 |
| 2,562,367 | Robinson | July 31, 1951 |
| 2,618,392 | Taup | Nov. 25, 1952 |
| 2,669,098 | Buell | Feb. 16, 1954 |